(12) United States Patent
Kamichoff et al.

(10) Patent No.: US 10,951,502 B1
(45) Date of Patent: Mar. 16, 2021

(54) NETWORK LINK LIVENESS DETECTION

(71) Applicant: Amazon Technologies, Inc., Seattle, WA (US)

(72) Inventors: Mark Kamichoff, Seattle, WA (US); Ke Zhang, San Jose, CA (US); Dongling Duan, San Jose, CA (US); Ravi Manghirmalani, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/419,886

(22) Filed: May 22, 2019

(51) Int. Cl.
H04L 12/26 (2006.01)
H04L 12/24 (2006.01)

(52) U.S. Cl.
CPC ...... *H04L 43/0817* (2013.01); *H04L 41/0672* (2013.01); *H04L 43/10* (2013.01)

(58) Field of Classification Search
CPC ........ H04L 45/245; H04L 69/14; H04L 45/28
See application file for complete search history.

(56) References Cited

U.S. PATENT DOCUMENTS 8,817,817 B2 * 8/2014 Koenen ............... H04L 12/10 370/468
10,581,726 B2 * 3/2020 Mirsky ................ H04L 45/50

* cited by examiner

*Primary Examiner* — Chandrahas B Patel
(74) *Attorney, Agent, or Firm* — Klarquist Sparkman, LLP

(57) ABSTRACT

An extension is provided to a Link Aggregation Control Protocol (LACP) that can use the LACP protocol transport and provides Link Aggregation Group (LAG) management while also functioning as a full liveness detection protocol. Bi-directional link detection is supported and timers are configurable to any number. The extension can be backwards compatible with standard LACP and can use a sub-type that is specified as unused. The extension can start up using standard LACP packet rates and include additional information in the unused subtype. If a LACP speaker does not support the extension, then the protocol conforms to standard LACP. A state machine of the extension is used if it detects conforming information from a peer speaker. The state machine can allow faster detection should a link error occur.

18 Claims, 6 Drawing Sheets

NETWORK LINK LIVENESS DETECTION

BACKGROUND

Liveness detection is a feature that allows a networking switch (or any host) to determine if a link is healthy and if it can continue to pass network packets. A healthy link is bidirectional and is not suffering from excessive amounts of packet loss or corruption. When a liveness detection process discovers that a link is no longer healthy, it notifies one or more upper layers that the link should be considered operationally down to avoid continued traffic impact. An example of a liveness detection protocol is Bidirectional Forwarding Detection (BFD). Link Aggregation Control Protocol (LACP) is an IEEE 802 protocol standardized as 802.3ad. Its main purpose is to dynamically manage bundled Ethernet links, which are referred to as a Link Aggregate Group (LAG). LAGs are used to increase network capacity through the use of multiple links between two network switches by presenting the bundled links as a logical interface on the switches. Traffic is balanced across the bundled links using various strategies.

DETAILED DESCRIPTION

While the LACP provides rudimentary checks to determine if traffic should still be sent across links, it does not perform full liveness detection and does not include bi-directional link detection or arbitrarily configurable timers. If a bad link is detected using LACP, it can take multiple seconds to report, which is a considerable amount of time during which network packets can be lost. As a result, it is desirable for LACP to be modified as to allow more robust and faster detection of defective links.

An extension is provided to LACP that can use the LACP protocol transport (Ethertype 0x8809) and provides Link Aggregation Group (LAG) management while also functioning as a full liveness detection protocol. Bi-directional link detection is supported and timers are configurable to any value (e.g., 100 ms, 200 ms, 300 ms, etc.). The extension can be backwards compatible with standard LACP and can use a subtype that, for example, is specified as unused in the 802.3ad standard. The extension can start up using standard LACP packet rates and include additional information in this unused subtype (0xa). If a LACP peer does not support the extension, then the protocol conforms to 802.3ad LACP. A state machine of the extension is used if it detects conforming information from the peer device. Downgrading back to 802.3ad LACP is supported through a combination of receiving LACP packets without the 0xa subtype and the "sleep" feature that automatically downgrades when a remote device is silent for a period of time. The extension provides the benefits of LACP with improved liveness detection in a single protocol that can be deployed incrementally on a network. The liveness detection ensures that the link is operational in both directions of transmission.

Figure 1:
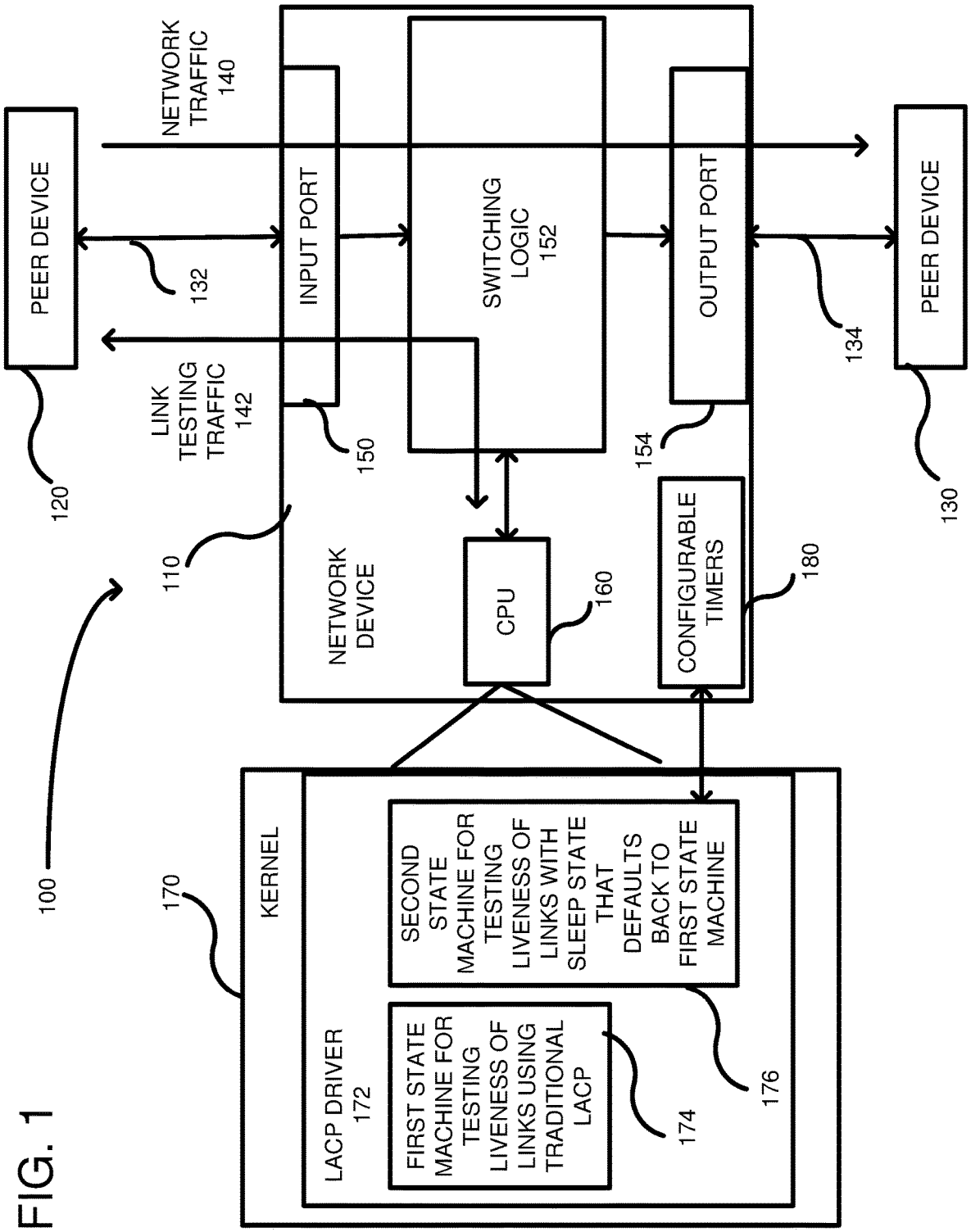
FIG. 1 is a system diagram of a network device coupled to multiple peer network devices through links, and a LACP driver used to test the links.

FIG. 1 is a system 100 including multiple network devices. In the example, of FIG. 1, three network devices are shown at 110, 120, and 130, but typically the network devices are in a network that can include hundreds or thousands of network devices. The network devices 110, 120, 130 can be any switches for forwarding packet data including, but are not limited to, routers, switches, load balancers, firewalls, etc. The network devices 110, 120, 130 can have a similar structure, but only further details of network device 110 are shown for simplicity. Network device 110 is coupled to the other network devices 120, 130 through a physical interconnect or link 132, 134, such as a cable. The links 132, 134 are bi-directional and can carry network traffic 140 and link testing traffic 142. Although only two links are shown, network devices typically have many additional ports. The network traffic 140 enters on an input port 150, passes through switching logic 152, which routes the network traffic 140 to an output port 154. The input port 150 and the output port 154 can be the same port if a packet is received from a peer device and routed back to the same peer device. The link testing traffic 142 can enter through the input port 150, but is identified as a test packet in the switching logic 152, which re-directs the testing traffic to a central processing unit (CPU) 160. The CPU can be a wide variety of different types of processing units, such as a general-purpose central processing unit (CPU), processor in an application-specific integrated circuit (ASIC) or any other type of processor. The CPU can execute an operating system kernel 170 that includes a LACP driver 172. The LACP driver includes a first state machine 174 that performs testing of liveness of the links 132, 134 using traditional LACP, which is defined in the protocol. A second state machine 176 is also executed in the LACP driver 172 that supplements the traditional LACP testing of link liveness. The second state machine 176 includes a sleep state, as further described below, that defaults back to the testing performed in the first state machine 174. The second state machine 176 can use a plurality of configurable timers 180 within the network device 110 so as to configure a frequency with which liveness detection can be tested. For example, the timers can be set such that link testing traffic 142 is transmitted every 100 ms. Other times can be used. The configurable timers 180 can be set by a system administrator or a monitoring server computer (not shown) which can push messages to the CPU 160 through a separate communication channel or through control messages sent through the input port 150.

Thus, two different state machines 174, 176 can be within the kernel 170 of the network device, and both can perform liveness detection, with the second state machine 176 having access to configurable timers 180 to allow it to test at a higher frequency. Although shown as separate state machines, the first and second state machines can be considered a single state machine with alternative paths. The second state machine can detect a link liveness error faster than the first state machine, based on the settings of the configurable timers. Additionally, the second state machine 176 can perform bi-directional testing to ensure traffic is flowing in both directions across the links 132, 134. If the second state machine 176 enters a sleep state, then liveness detection defaults to the first state machine 174, which follows the standard LACP protocol. There are different state machines 176 for each port, although only one state machine is shown for simplicity.

Figure 2:
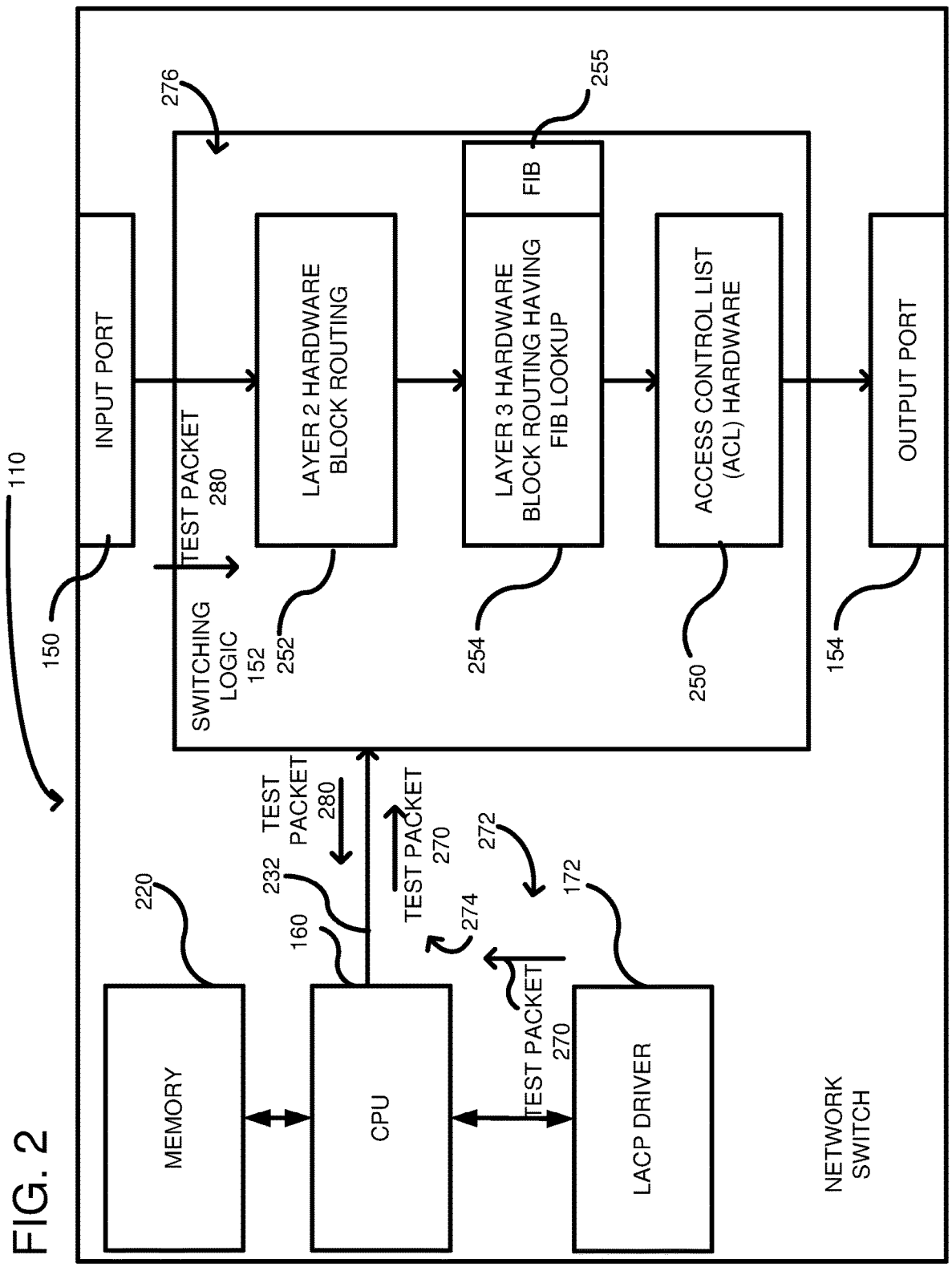
FIG. 2 is a detailed embodiment of the network device executing the LACP driver of FIG. 1.

FIG. 2 shows a detailed example of an embodiment of the network device 110. The network device is a switch that routes packets to a next hop in the network using a destination IP address. The CPU 160 is coupled to a memory 220 and to the switching logic 152 through a bus 232 (PCIe or other protocols and bus types can be used). The switching logic 152 is positioned between the input port 150 and the output port 154, which are typically adapted to receive network cables, such as Ethernet cables. The switching logic 152 can be a single ASIC integrated circuit or divided into multiple integrated circuits. The switching logic 152 can include multiple different hardware logic blocks including a Layer 2 hardware block 252, a Layer 3 hardware block 254, and an Access Control List (ACL) hardware block 250. The layer 2 hardware block 252 relates to an Ethernet layer and can forward packets based on MAC tables. The layer 3 hardware block 254 relates to forwarding based on a lookup of an IP address. Layer 3 typically involves a route lookup, decrementing the Time-To-Live (TTL) count, calculating a checksum, and forwarding the packet with the appropriate MAC header to the correct output port. The route lookup of the layer 3 hardware can include searching within a Forwarding Information Base (FIB) 255, which includes destination addresses for packets being transmitted through the switching logic. The network device can run routing protocols, such as an Open Shortest Path First (OSPF) or a Routing Information Protocol (RIP), to communicate with other Layer 3 switches or routers. The ACL block 250 relates to permissions and can include rules whether to drop packets. The different hardware blocks can be coupled in series and additional hardware blocks can be added based on the design. Packets pass from the input port 150 to the output port 154 in accordance with the configuration of the hardware logic blocks 250, 252, 254. Although only a single input and output port are shown, usually there are multiple ports on the switch.

As shown, the LACP driver 172 can execute on the CPU 160 and can be used to control testing of links coupled to the network device 110 using one or more test packets 270. As shown at 272, the LACP driver passes the test packets 270 to the CPU hardware 160 for transmitting the test packets to the switching logic 152 via the bus 232 (as shown at 274). The test packets are then injected into an input pipeline of the switching logic (such as via a CPU port), such that it passes into Layer 2 hardware 252, Layer 3 hardware 254 and the ACL hardware 250. The test packet includes a layer 2 header wherein the destination MAC address equals a MAC address of the network device. The input port 150, output port 154 and the switching logic 152 can be considered a data plane of the network device. By contrast, the CPU 160, memory 220, and LACP driver 172 are considered part of a control plane.

Generally, the test packets 270 are transmitted to the peer network devices 120, 130 over the links 132, 134 (FIG. 1). Test packets are also received through the input ports 150 as shown at 280 and are detected as test packets in the layer 2 hardware 252. For example, although not shown, a comparator circuit in the layer 2 hardware can detect a field in the packet, such as an Ethertype in a header of the packet, which indicates the packet is a test packet. In such a case, the packet is passed back to the CPU 160 over bus 232 for analysis by the LACP driver 172. The LACP driver 172 can then process the test packet 280 in accordance with the state machine 176 described further below.

Figure 3:
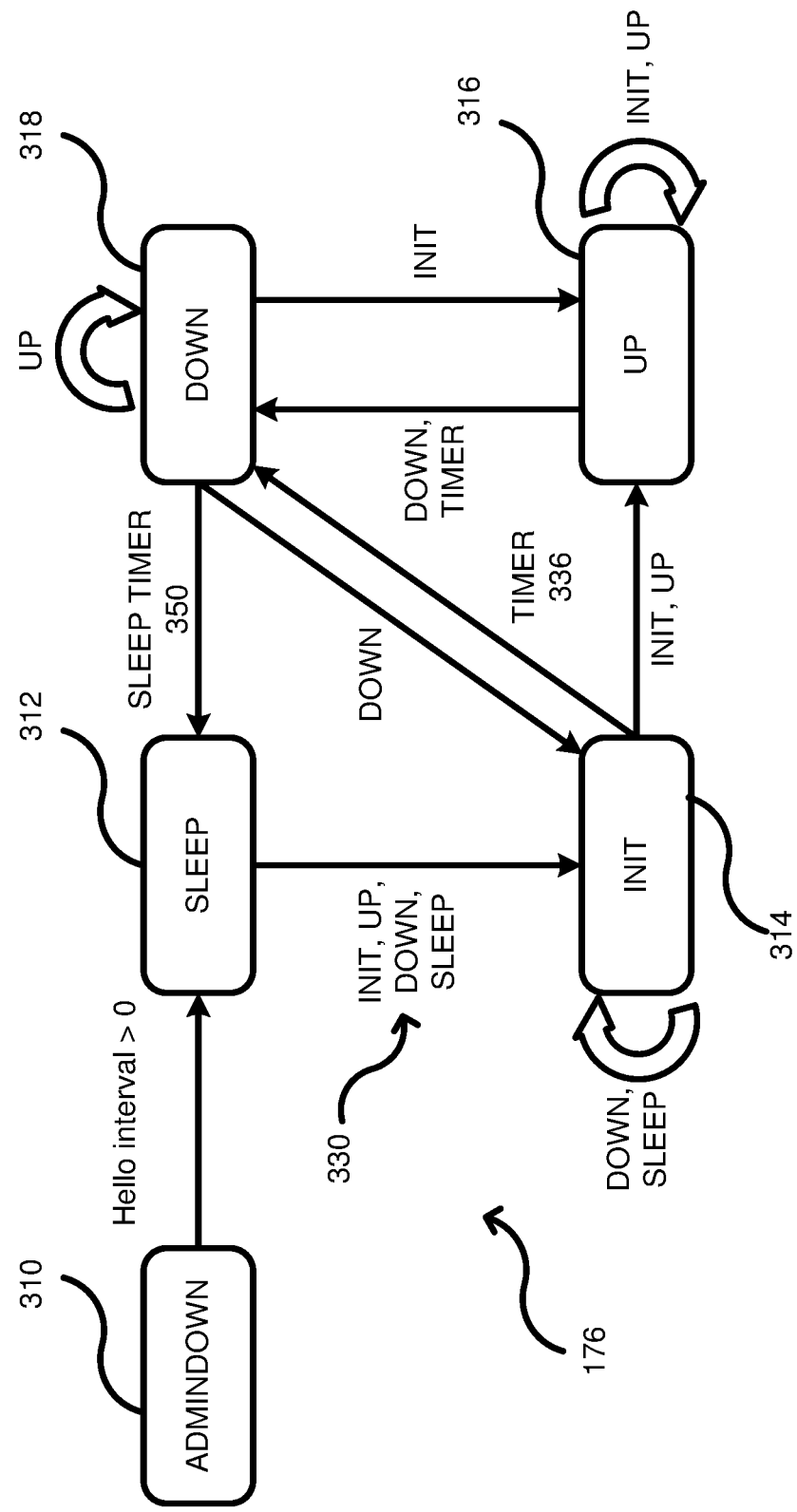
FIG. 3 is an example state machine that can execute within the LACP driver.

FIG. 3 shows details of the second state machine 176. The state machine includes 5 states including an administrative down state 310, a sleep state 312, an initialization state 314, an up state 316 and a down state 318. The administration state 310 (labeled "ADMINDOWN" in FIG. 3) is entered into when the timers 176 (FIG. 1) are set to 0, indicating that the user has turned off the liveness testing using the second state machine. When the timers are set to a non-zero value, the state machine 176 enters the sleep state 312. In the sleep mode, test packets are sent to peers in order to detect if the peers respond with a corresponding test packet. However, if no reciprocating test packet is received, liveness testing defaults to the LACP liveness testing (first state machine 174, FIG. 1). Once any packet is received from a peer device that complies with second state machine 176 (i.e., a packet is received having a header field indicating that the packet is associated with a liveness test), then a transition in the state machine occurs from the sleep state 312 to the initialization state 314 (labeled "INIT" in FIG. 3). Specifically, as shown at 330, packets received from the peer devices include a state of a corresponding state machine executing on the peer device. Thus, if the peer device indicates that it is in the initialization state, the up state, the down state, or the sleep state, then the state machine 176 transitions from the sleep state 312 to the initialization state 314.

Once in the initialization state, the state machine 176 waits to hear from the peer device before transitioning to the up state 316. If a packet from the peer device is received that indicates that the peer device is either within the initialization state or the up state, then the state machine 176 transitions from the initialization state 314 to the up state 316. Otherwise, if the peer device transmits a packet indicating that the peer device is in a down state or a sleep state, then the state machine 176 remains in the initialization state 314. While in the initialization state, at predetermined time periods controlled by the timers 180 (FIG. 1), the state machine 176 transmits an initialization test packet to the peer device. Additionally, if a timer 180 times out (see timer indication 336) associated with how long a period of time has elapsed without receiving a packet from a peer, then the state machine 176 transitions from the initialization state 314 to the down state 318.

While in the up state 316, the state machine 176 remains in the up state so long as packets are being received from the peer device that indicate the peer device in in the initialization state or the up state. However, if no packets are received for a predetermined period of time or a down indication is received from the peer device, then the state machine 176 transitions to the down state 318. A packet indicating that the state machine 176 is in the up state 316 is sent to the corresponding peer device associated with the state machine at predetermined intervals in accordance with one of the timers 180.

While in the down state 318, the state machine 176 continues to remain in the down state if it receives up messages from the peer device. Otherwise, the state machine 176 transitions to the up state 316 if a packet is received from the peer device indicating that it is in an initialization state. If a packet is received from the peer device indicating that the peer device is in a down state, then the state machine 176 transitions from the down state 318 to the initialization state 314. Finally, if no packets are received while in the down state for more than a sleep timer 350, the state machine 176 transitions from the down state 318 to the sleep state 312, wherein liveness testing defaults to the first state machine 174.

Thus, the driver 172 operates such that every clock cycle for every interface with either a timer expiring or a packet received, which corresponds to the state machine, the state machine 176 is executed. Flags can be set to force the LACP driver to notice that the state machine has transitioned in or out of the up state 316. If the state machine 176 indicates that the link is down, the FIB 255 can be updated to avoid sending packets over that link. Thus, network traffic can be re-routed based on the link down detection. Conversely, if the link is brought back up, the FIB can be updated to re-route traffic through the network link.

Figure 4:
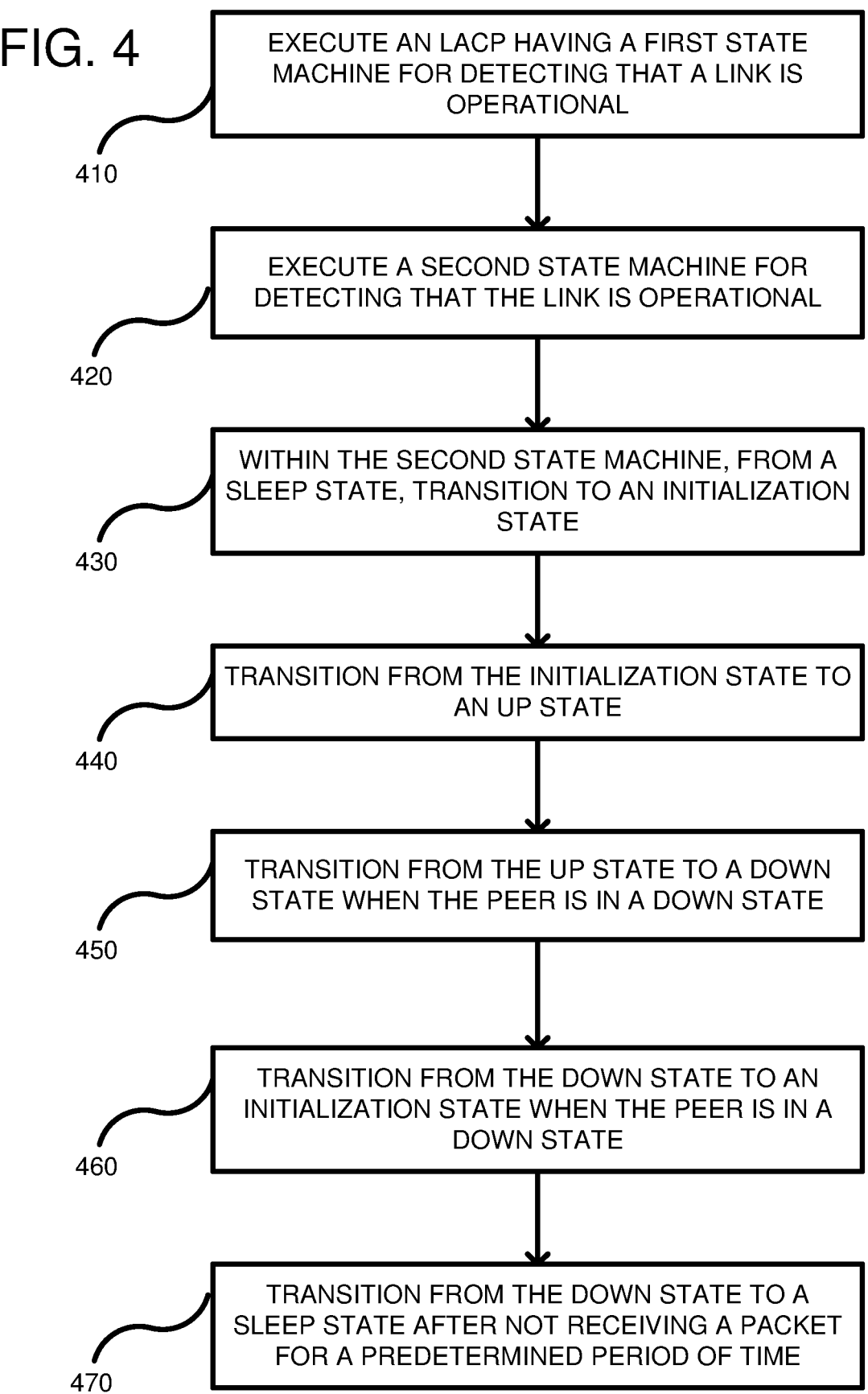
FIG. 4 is a flowchart according to one embodiment for detecting link liveness in a network.

FIG. 4 is a method according to one embodiment for detecting link liveness in a network. In process block 410, a link aggregation control protocol is executed having a first state machine for detecting that a link is operational. For example, in FIG. 1, a LACP driver 172 can have a first state machine 174 that executes in a kernel 170. In process block 420, a second state machine for detecting that a link is operational can be executed. For example, the second state machine 176 in FIG. 1 can execute in the same LACP driver 172 as the first state machine 174. In process block 430, within a sleep state of the second state machine, a transition is made to an initialization state after receiving a packet that conforms to the second state machine. For example, in FIG. 3, the state machine 176 can transition from a sleep state 312 to the initialization state 314 upon receiving any packet from a peer device related to testing the network link. Thus, conforming can include receiving a packet that has an Ethernet packet type matching a predetermined packet type. In process block 440, a transition can be made from the initialization state to an up state. For example, in FIG. 3, a transition can be made from the initialization state 314 to the up state 316 upon receiving a packet from the peer device indicating that the peer is either in the initialization state or the up state. In process block 450, a transition can be made from the up state to a down state when the peer is in a down state. In FIG. 3, for example, the state machine 176 can transition from the up state 316 to the down state 318 when it receives an indication that the peer is in the down state. In process block 460, a transition can be made from the down state to an initialization state when the peer is in the down state. In FIG. 3, when a packet indicates the peer is in a down state, the state machine 176 transitions from the down state 318 to the initialization state 314. In process block 470, the state machine can transition from the down state to a sleep state after not receiving a packet for a predetermined period of time. In FIG. 3, a transition can be made from the down state 318 to the sleep state 312 upon expiration of a sleep timer as shown at 350. The sleep timer can one of the timers 180 shown in FIG. 1, wherein each port has its own associated sleep timer.

Figure 5:
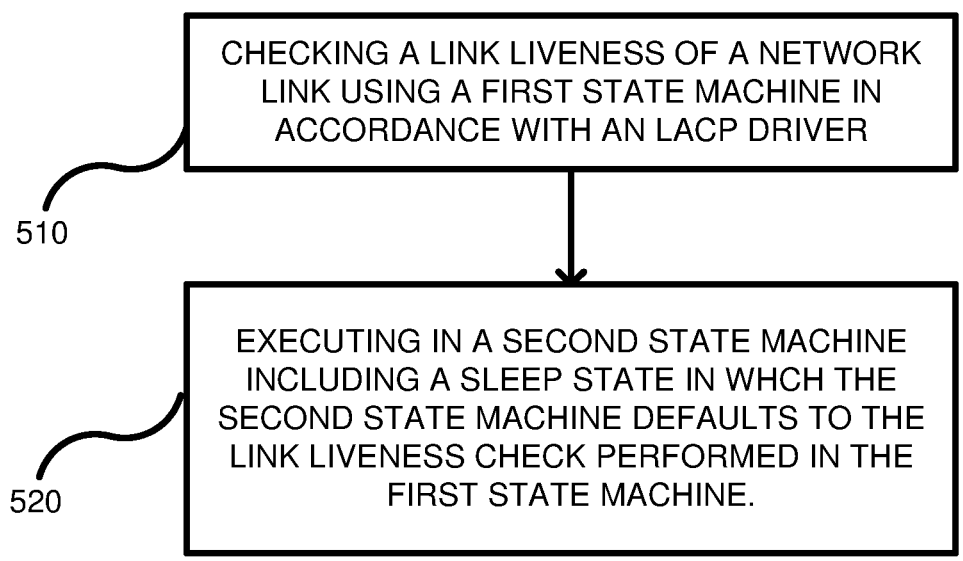
FIG. 5 is a flowchart according to another embodiment for detecting link liveness.

FIG. 5 is a flowchart according to another method for liveness detection of a link. In process block 510, a link liveness is checked of a network link using a first state machine in accordance with an LACP driver. For example, in FIG. 1, the first state machine 174 can be a state machine that is standard with the LACP driver and has only fast and slow timer options. In process block 520, a second state machine can be executed that includes a sleep state. While in the sleep state, the second state machine defaults to the link liveness check performed by the first state machine. For example, in FIG. 3, in the sleep mode 312, the state machine 176 can continually send sleep notifications to the peer network devices at predetermined time intervals, but otherwise, defaults to the link liveness test of the first state machine 174 of FIG. 1. Thus, in a sleep mode, the second state machine does not perform liveness tests of the links. In some examples, the peer devices have different versions of software than the network device, so the sleep state allows the network device to implement the traditional first state machine. In general, the second state machine can check the link liveness at a time interval that is faster than the first state machine and the timers can be set to any integer value. If desired, the time interval can be set so that the second state machine checks the link liveness at slower time intervals than the first state machine. The timer value can be multiples of 100 ms, such as 100 ms, 200 ms, 300 ms . . . etc.

Figure 6:
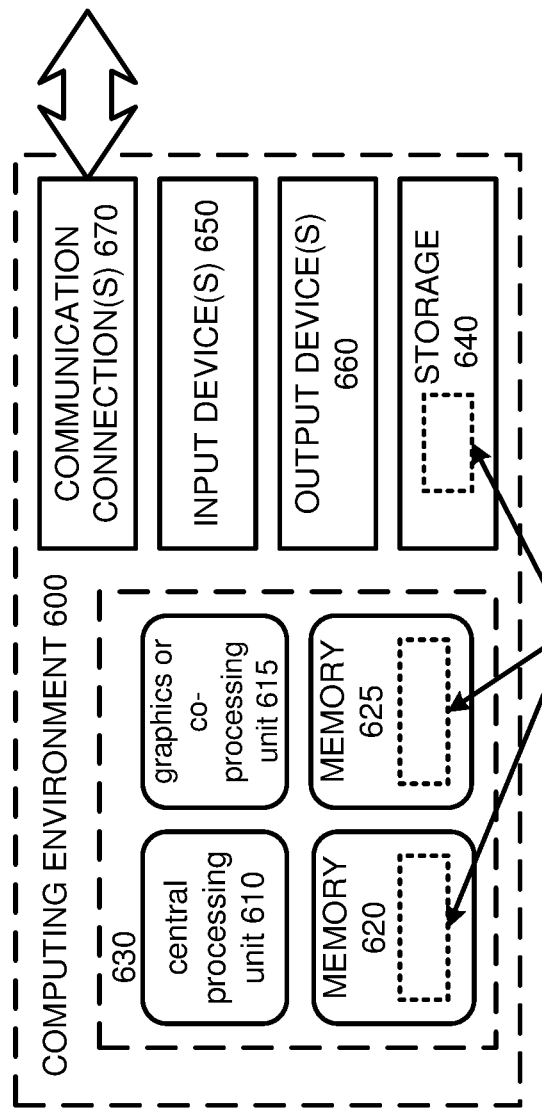
FIG. 6 depicts a generalized example of a suitable computing environment in which the described innovations may be implemented.

FIG. 6 depicts a generalized example of a suitable computing environment 600 in which the described innovations may be implemented. The computing environment 600 is not intended to suggest any limitation as to scope of use or functionality, as the innovations may be implemented in diverse general-purpose or special-purpose computing systems. For example, the computing environment 600 can be any of a variety of computing devices.

With reference to FIG. 6, the computing environment 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

A computing system may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing environment 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing environment 600. The output device(s) 660 may be a display, printer, speaker, CD-writer, or another device that provides output from the computing environment 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of detecting link liveness in a network, the method comprising:
   in a kernel of a network switch, executing a link aggregation control protocol (LACP) driver that has a first state machine for detecting that a link from the network switch to a peer network switch is operational;
   executing a second state machine within the kernel for detecting that the link to the peer network switch is operational, the second state machine executing within the LACP driver;
   within the second state machine:
   transitioning from a sleep state to an initialization state upon receiving a packet from the peer network device;
   transitioning from the initialization state to an up state when a packet is received indicating that the peer network device is in the initialization state or the up state;
   transitioning from the up state to a down state when a packet is received indicating that the peer network device is in the down state;
   transitioning from the down state to the initialization state upon receiving a packet indicating that the peer network device is in the down state or a timer expires; and
   transitioning from the down state to the sleep state after not receiving a packet from the peer network device for a predetermined period of time.

2. The method of claim 1, wherein the packet has an Ethernet packet type indicating that the packet is for the second state machine.

3. The method of claim 1, wherein the second state machine detects a link liveness error faster than the first state machine.

4. The method of claim 1, wherein when the second state machine is in the sleep state, the link liveness detection defaults to the first state machine.

5. The method of claim 1, further including detecting a link liveness error using the second state machine and changing a forwarding information base (FIB) in the network switch in response thereto so as to route packets away from the link.

6. A method, comprising:
   in a network device, checking a link liveness of a network link using a first state machine in accordance with a link aggregation control protocol (LACP) driver;
   executing a second state machine, different than the first state machine and within the LACP driver, to check the link liveness, wherein the second state machine includes a sleep state in which the second state machine defaults to the link liveness check performed by the first state machine; and checking the link liveness using the second state machine by transmitting and receiving packets from a peer network device in order to bi-directionally test the network link between the network device and the peer network device.

7. The method of claim 6, further including detecting that a received packet is a link liveness test packet in layer 2 of the network device and transmitting the received packet to a processor executing the first and second state machines.

8. The method of claim 6, wherein the first state machine checks the link liveness at a first time interval, and the second state machine checks the link liveness at a second time interval, faster than the first time interval.

9. The method of claim 6, wherein the first state machine and the second state machine are within a kernel executing on a processor within the network device.

10. The method of claim 6, further including detecting, using the second state machine, that the network link is defective and modifying a forwarding information base (FIB) in a switching portion of the network device in response thereto.

11. The method of claim 6, wherein the second state machine tracks whether the network link is up or down based on bidirectional communication between the network device and a peer network device.

12. The method of claim 6, wherein the second state machine and the first state machine form a combined state machine.

13. The method of claim 6, further comprising, starting in a sleep state, transitioning the second state machine to an initialization state upon receiving a packet from a peer network device.

14. The method of claim 13, further including transitioning the second state machine to an up state and remaining in an up state as long as bidirectional packets are being exchanged between the network device and the peer network device.

15. A network device, comprising:

switching hardware for receiving and forwarding packets through the network device in accordance with a forwarding information base (FIB);

control hardware coupled to the switching hardware, the control hardware for executing first and second state machines that test links to peer devices, the first state machine being part of a link aggregation control protocol (LACP) and the second state machine being included in a LACP driver; and multiple ports for coupling to the peer devices via the links and wherein the control hardware is for executing the first and second state machines for each of the multiple ports.

16. The network device of claim 15, wherein the second state machine is for bi-directional testing of the links to the peer devices.

17. The network device of claim 15, wherein the switching hardware includes layer 2 hardware and layer 3 hardware, the layer 2 hardware being for detecting test packets used to test the links to the peer devices and for transmitting the test packets to the control hardware for use by the first or second state machine.

18. The network device of claim 15, wherein the control hardware includes a processor and the second state machine includes a sleep state during which only the first state machine tests the links to the peer devices.

\* \* \* \* \*